United States Patent
Sugawara et al.

(10) Patent No.: US 11,646,677 B2
(45) Date of Patent: May 9, 2023

(54) ELEMENT AND METHOD FOR MANUFACTURING ELEMENT

(71) Applicant: Ricoh Company, Ltd., Tokyo (JP)

(72) Inventors: Tomoaki Sugawara, Kanagawa (JP); Junichiro Natori, Kanagawa (JP); Tsuneaki Kondoh, Kanagawa (JP); Yuko Arizumi, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 113 days.

(21) Appl. No.: 17/060,346

(22) Filed: Oct. 1, 2020

(65) Prior Publication Data

US 2021/0111644 A1  Apr. 15, 2021

(30) Foreign Application Priority Data

Oct. 11, 2019 (JP) .............................. JP2019-188072

(51) Int. Cl.
*H02N 1/04* (2006.01)
*H01G 7/02* (2006.01)

(52) U.S. Cl.
CPC ............... *H02N 1/04* (2013.01); *H01G 7/021* (2013.01)

(58) Field of Classification Search
CPC . H01G 7/021; H02N 1/04; H02N 1/08; H01L 41/113; H01L 41/047; H01L 41/083; H01L 41/193; H01L 23/532; H01L 21/316; H01L 21/02; H01L 21/3105; H01L 23/52; H01L 21/70; H01L 21/768
USPC ......................................................... 310/310
See application file for complete search history.

(56) References Cited

U.S. PATENT DOCUMENTS

| | | |
|---|---|---|
| 2012/0169179 A1 | 7/2012 | Masaki et al. |
| 2013/0057110 A1 | 3/2013 | Aoyagi et al. |
| 2015/0380636 A1* | 12/2015 | Fujisawa .................. C08K 3/36 524/847 |
| 2017/0093305 A1 | 3/2017 | Sugawara et al. |
| 2017/0148973 A1 | 5/2017 | Imai et al. |
| 2017/0170749 A1 | 6/2017 | Arizumi et al. |
| 2017/0207729 A1 | 7/2017 | Kondoh et al. |
| 2017/0214338 A1 | 7/2017 | Otagiri et al. |
| 2017/0324023 A1 | 11/2017 | Kondoh et al. |
| 2018/0013057 A1 | 1/2018 | Arizumi et al. |
| 2018/0054141 A1 | 2/2018 | Natori et al. |
| 2018/0145244 A1 | 5/2018 | Otagiri et al. |
| 2018/0156639 A1 | 6/2018 | Miyazawa et al. |
| 2019/0030732 A1 | 1/2019 | Kondoh et al. |

(Continued)

FOREIGN PATENT DOCUMENTS

| | | |
|---|---|---|
| CN | 103780130 A | 5/2014 |
| EP | 3 429 075 A1 | 1/2019 |

(Continued)

OTHER PUBLICATIONS

MatWeb Overview of materials (Year: 2022).*

(Continued)

*Primary Examiner* — Ahmed Elnakib
(74) *Attorney, Agent, or Firm* — Xsensus LLP

(57) ABSTRACT

An element includes a pair of electrodes, an intermediate layer between the pair of electrodes, and at least one insulator layer between the pair of electrodes. The intermediate layer contains a silicon compound including unpaired electrons as a material. The intermediate layer is deformable.

11 Claims, 4 Drawing Sheets

(56) References Cited

U.S. PATENT DOCUMENTS

| | | |
|---|---|---|
| 2019/0061179 A1 | 2/2019 | Natori et al. |
| 2019/0089353 A1* | 3/2019 | Araumi ............... H01L 41/1132 |
| 2019/0103548 A1* | 4/2019 | Sugawara ................ H02N 1/04 |
| 2021/0111644 A1* | 4/2021 | Sugawara .............. H01G 7/021 |

FOREIGN PATENT DOCUMENTS

| | | |
|---|---|---|
| JP | 5126038 | 11/2012 |
| JP | 5691080 | 2/2015 |
| JP | 5945102 | 6/2016 |
| JP | 2017/126722 | 7/2017 |
| JP | 2017-135775 | 8/2017 |
| JP | 6415451 | 10/2018 |
| JP | 6658864 | 2/2020 |

OTHER PUBLICATIONS

Extended European Search Report dated Jan. 28, 2021 in European Patent Application No. 20198926.6, 6 pages.

Tatsuo Takada, "Resin for Measurement and Analysis of Space Charge Accumulation" Sodick DAC, vol. III, pp. 108-111, Oct. 30, 2017.

Tatsuo Takada, "Resin for Measurement and Analysis of Space Charge Accumulation" Sodick DAC, vol. II, pp. 285-289, Oct. 30, 2017.

\* cited by examiner

ELEMENT AND METHOD FOR MANUFACTURING ELEMENT

CROSS-REFERENCE TO RELATED APPLICATIONS

The present application claims priority under 35 U.S.C. § 119 to Japanese Patent Application No. 2019-188072, filed on Oct. 11, 2019. The contents of which are incorporated herein by reference in their entirety.

BACKGROUND OF THE INVENTION

1. Field of the Invention

The present invention relates to an element and a method for manufacturing the element.

2. Description of the Related Art

Techniques for converting vibrations into electrical energy for effective use have heretofore been proposed. Examples of the vibrations include vibrations of structures such as a road, bridge, building, and industrial machine, vibrations of moving bodies such as an automobile, railway car, and aircraft, vibrations caused by human motion, and ambient vibrations common in the environment (wave and wind power vibration energy).

Power generation methods for converting such vibration energy into electricity are broadly classified into ones using electromagnetic induction, ones using piezoelectric elements, and ones using electrostatic induction.

A method using electromagnetic induction includes changing the relative positions of a coil and a magnet by vibrations, and generating power by electromagnetic induction occurring on the coil. A method using a piezoelectric element mainly uses a ceramic piezoelectric element. This method utilizes a phenomenon that a charge is induced on the surface of the piezoelectric element when the piezoelectric element is distorted by vibrations.

A method using electrostatic induction typically uses an electret dielectric that semipermanently retains a charge. The relative positions of the electret dielectric and an electrode located at a distance from the electret dielectric are changed by vibrations and the like, whereby a charge is electrostatically induced on the electrode for power generation. Power generation devices using such a principle are disclosed, for example, in Japanese Unexamined Patent Application Publication No. 2017-135775 and Japanese Unexamined Patent Application Publication No. 2017-126722.

To increase the amount of power generation by a power generation device using electrostatic induction, it is advantageous to make the dielectric thinner to increase the relative permittivity εr. The power generation performance is known to improve as the thickness of an intermediate layer decreases.

However, silicone rubber and the like used as the intermediate layer typically have extremely low tear strength compared to resins and the like. If silicone rubber and the like are used as the intermediate layer and the intermediate layer is thinly formed to improve the power generation performance, defects are therefore likely to occur. This causes a problem of increased initial failure rate during manufacturing and low durability.

SUMMARY OF THE INVENTION

According to an aspect of the present invention, an element includes a pair of electrodes, an intermediate layer between the pair of electrodes, and at least one insulator layer between the pair of electrodes. The intermediate layer contains a silicon compound including unpaired electrons as a material. The intermediate layer is deformable.

BRIEF DESCRIPTION OF THE DRAWINGS

The accompanying drawings are intended to depict exemplary embodiments of the present invention and should not be interpreted to limit the scope thereof. Identical or similar reference numerals designate identical or similar components throughout the various drawings.

DESCRIPTION OF THE EMBODIMENTS

Figure 1:
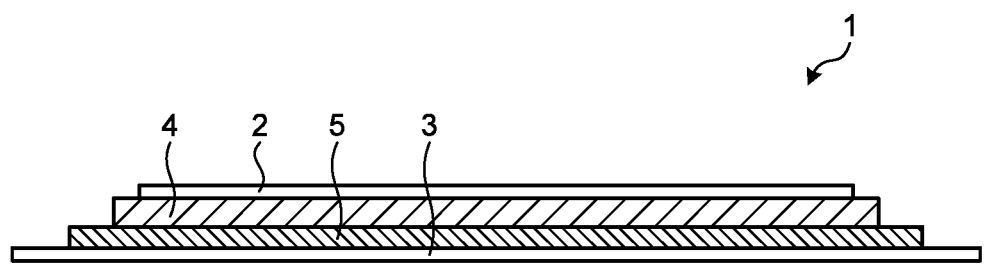
FIG. 1 is a diagram schematically showing a cross section of an element according to an embodiment.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

An embodiment of the present invention will be described in detail below with reference to the drawings.

An embodiment has an object to reduce the initial failure rate during manufacturing and improve durability in a case where an intermediate layer having low tear strength is thinly formed.

An embodiment of an element and a method for manufacturing the element will be described in detail below with reference to the accompanying drawings.

Overview

FIG. 1 is a diagram schematically showing a cross section of an element 1 according to the embodiment. The element 1 includes a first electrode 2, a second electrode 3, an intermediate layer 4, and an insulator layer 5. The first and second electrodes 2 and 3 are opposed to each other. The intermediate layer 4 is located between the first and second electrodes 2 and 3 and made of rubber or a rubber composition. The insulator layer 5 is located between the intermediate layer 4 and the second electrode 3. In other words, the element 1 includes the first electrode 2 that is an upper electrode, the intermediate layer 4, the insulator layer 5, and the second electrode 3 that is a lower layer, which are stacked in this order from above. As shown in FIG. 1, the element 1 includes the intermediate layer 4 and the insulator layer 5 in close contact with each other.

The element 1 may include the first electrode 2, the insulator layer 5, the intermediate layer 4, and the second electrode 3 stacked in this order.

The element 1 further includes other members as appropriate. Examples will be described below.

Figure 2:
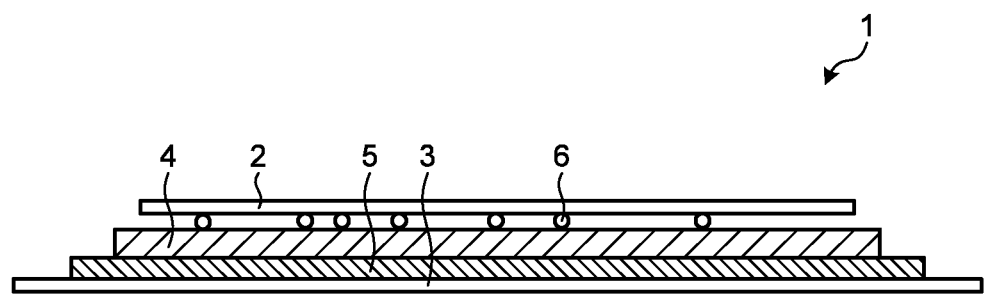
FIG. 2 is a diagram schematically showing a cross section of modification 1 of the element.

FIG. 2 is a diagram schematically showing a cross section of modification 1 of the element 1.

In modification 1 shown in FIG. 2, the element 1 includes a spacer 6 interposed between the first electrode 2 and the intermediate layer 4. Although not shown in particular, the element 1 may include a spacer 6 interposed between the second electrode 3 and the insulator layer 5.

If the first electrode 2, the insulator layer 5, the intermediate layer 4, and the second electrode 3 are stacked in this order, the element 1 may include the spacer 6 between the second electrode 3 and the intermediate layer 4 or between the first electrode 2 and the insulator layer 5.

Expanded microcapsules or unexpanded grade Matsumoto Microspheres (Matsumoto Yushi-Seiyaku Co., Ltd.) may be used as the spacer 6. Alternatively, the spacer 6 may be made of silicone rubber. The configuration with the spacer 6 facilitates separation charging of the intermediate layer 4, whereby an electrostatic effect of the element 1 can be improved.

In an initial state that is a stable state after fabrication, the element 1 usually has no surface charge or internal charge. If a perpendicular load acts on the intermediate layer 4 from outside, the first electrode 2 that is initially separated from the intermediate layer 4 by the spacer 6 repeats contact and separation to cause separation charging.

If the element 1 includes no spacer 6 as shown in FIG. 1, the element 1 can generate voltage through movement of the electrodes when a bending operation is made on the element 1 in a triboelectrically charged state.

The intermediate layer 4 is given charge holding defects such as unpaired electrons by energy treatment using an electron beam, ultraviolet rays, or the like. The voltage of the separation charging injects charges into the charge holding defects. The stored charges and the electrodes are moved by an external load or repulsion thereto, whereby electricity can be generated. The intermediate layer 4 may contain particles having unpaired electrons. This gives the intermediate layer 4 more unpaired electrons, which are one of charge retention mechanisms, whereby high power generation can be maintained.

The intermediate layer 4 contains a silicon compound including unpaired electrons as a material and thus, is deformable. Examples of the intermediate layer 4 may include silicone rubber, modified silicone rubber, and silica powder irradiated with high energy such as an electron beam, gamma rays, and ultraviolet rays. The silicone rubber, modified silicone rubber, and the like used as the intermediate layer 4 generally have extremely low tear strength compared to resins and the like. If the silicone rubber, modified silicone rubber, or the like is used as the intermediate layer 4 and the intermediate layer 4 is thinly formed for improved generation performance, defects are therefore likely to occur. To solve such a problem, in the present embodiment, the insulator layer 5 is located in contact with the intermediate layer 4 to reduce the initial failure rate during manufacturing and improve durability.

Figure 3:
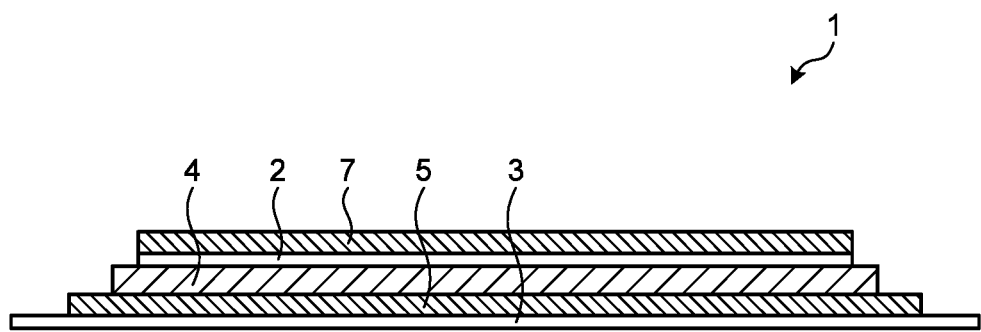
FIG. 3 is a diagram schematically showing a cross section of modification 2 of the element.

FIG. 3 is a diagram schematically showing a cross section of modification 2 of the element 1.

In modification 2 shown in FIG. 3, the element 1 further includes an insulator layer 7 stacked on the first electrode 2.

Figure 4:
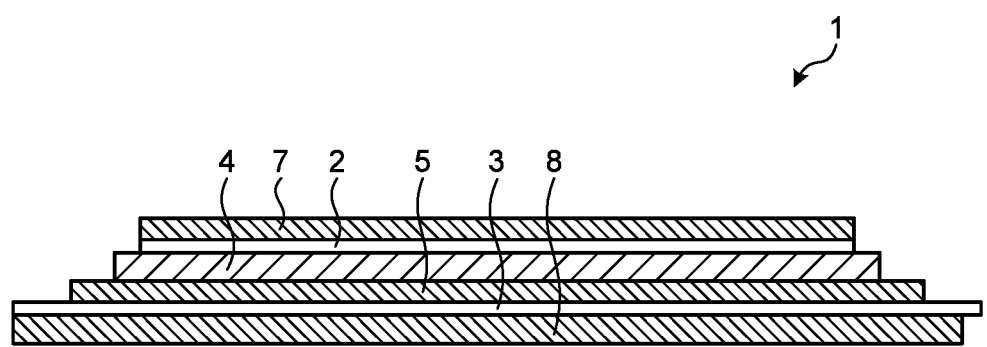
FIG. 4 is a diagram schematically showing a cross section of modification 3 of the element.

FIG. 4 is a diagram schematically showing a cross section of modification 3 of the element 1.

In modification 3 shown in FIG. 4, the element 1 further includes an insulator layer 8 stacked on the second electrode 3.

Details

First Electrode and Second Electrode

The materials, shapes, sizes, and structures of the first and second electrodes 2 and 3 are not limited in particular, and may be selected as appropriate according to the intended purpose.

The materials, shapes, sizes, and structures of the first and second electrodes 2 and 3 may be the same or different, but are preferably the same.

Examples of the materials of the first and second electrodes 2 and 3 may include metal, a carbon-based conductive material, a conductive rubber composition, a conductive polymer, and an oxide.

Examples of the metal may include gold, silver, copper, aluminum, stainless steel, tantalum, nickel, and phosphor bronze. Examples of the carbon-based conductive material may include carbon nanotubes, carbon fibers, and graphite. Examples of the conductive rubber composition may include a composition containing a conductive filler and rubber. Examples of the conductive polymer may include polyethylene dioxythiophene (PEDOT), polypyrrole, and polyaniline. Examples of the oxide may include indium tin oxide (ITO), indium oxide-zinc oxide (IZO), and zinc oxide.

Examples of the conductive filler may include a carbon material (for example, Ketjen black, acetylene black, graphite, carbon fiber (CF), carbon nanofiber (CNF), carbon nanotube (CNT), graphene, etc.), a metal filler (gold, silver, platinum, copper, aluminum, nickel, etc.), a conductive polymer material (polythiophene, polyacetylene, polyaniline, polypyrrole, polyparaphenylene, and any derivative of polyparaphenylene vinylene, or those doped with a dopant represented by an anion or cation to these derivatives), and an ionic liquid. These may be used alone or in combination of two or more.

Examples of the rubber may include silicone rubber, modified silicone rubber, acrylic rubber, chloroprene rubber, polysulfide rubber, urethane rubber, butyl rubber, fluorosilicone rubber, natural rubber, ethylene-propylene rubber, nitrile rubber, fluorine rubber, isoprene rubber, butadiene rubber, styrene-butadiene rubber, acrylonitrile-butadiene rubber, ethylene-propylene-diene rubber, chlorosulfonated polyethylene rubber, polyisobutylene, and modified silicone. These may be used alone or in combination of two or more.

Examples of the shapes of the first and second electrodes 2 and 3 may include a thin film. Examples of the structures of the first and second electrodes 2 and 3 may include fabrics, unwoven fabrics, knit fabrics, meshes, sponges, and unwoven fabrics made of layers of fibrous carbon materials.

The average thickness of the electrodes is not limited in particular, and may be selected as appropriate according to the intended purpose. In view of conductivity and flexibility, the average thickness is preferably 0.01 µm to 1 mm, and more preferably 0.1 µm to 500 µm. An average thickness of 0.01 µm or more provides appropriate mechanical strength and improved conductivity. An average thickness of 1 mm or less makes the power generation element deformable with favorable generation performance.

Intermediate Layer

The intermediate layer 4 is flexible.

The intermediate layer 4 satisfies at least either one of the following conditions (1) and (2):

Condition (1): when the intermediate layer 4 is pressurized in a direction orthogonal to the surface of the intermediate layer 4, the amount of deformation on the first electrode 2 side (one side) of the intermediate layer 4 is different from that on the second electrode 3 side (the other side) of the intermediate layer 4; and Condition (2): A universal hardness (H1) when the first electrode 2 side of the intermediate layer 4 is pressed in by 10 μm is different from a universal hardness (H2) when the second electrode 3 side of the intermediate layer 4 is pressed in by 10 μm.

The intermediate layer 4 can generate a large amount of power if both sides have different amounts of deformation or different hardness as described above. In the present invention, the amount of deformation refers to the maximum indentation depth of an indenter pressed against the intermediate layer 4 under the measurement condition to be described below. The universal hardness of the intermediate layer described above is just a preferred example and not limited to the foregoing description.

The universal hardness is determined by the following method.

Measurement Condition

Measuring instrument: HM2000 manufactured by Fischer Instruments K.K.

Indenter: square pyramidal diamond indenter with an apex angle of 136°

Indentation depth: 10 μm

Initial load: 0.02 mN

Maximum load: 100 mN

Time to increase load from initial load to maximum load: 50 seconds

The ratio (H1/H2) of the universal hardness (H1) to the universal hardness (H2) is preferably 1.01 or more, more preferably 1.07 or more, and most preferably 1.13 or more.

There is no particular upper limit to the ratio (H1/H2). For example, the ratio is selected as appropriate on the basis of factors such as the degree of flexibility needed in the use condition and the load in the use condition, whereas 1.70 or less is preferable. H1 represents the universal hardness of the relatively harder surface, and H2 represents the universal hardness of the relatively softer surface.

The material of the intermediate layer 4 is not limited in particular and may be appropriately selected according to the intended purpose, and examples thereof may include rubber and a rubber composition. Examples of the rubber may include silicone rubber, modified silicone rubber, acrylic rubber, chloroprene rubber, polysulfide rubber, urethane rubber, butyl rubber, fluorosilicone rubber, natural rubber, ethylene-propylene rubber, nitrile rubber, fluorine rubber, isoprene rubber, butadiene rubber, styrene-butadiene rubber, acrylonitrile-butadiene rubber, ethylene-propylene-diene rubber, chlorosulfonated polyethylene rubber, polyisobutylene, and modified silicone. These may be used alone or in combination of two or more. Among these, silicone rubber and modified silicone rubber are preferable.

The silicone rubber is not limited in particular as long as it is rubber having a siloxane bond, and can be appropriately selected according to the intended purpose. Examples of the silicone rubber may include dimethyl silicone rubber, methylphenyl silicone rubber, fluorosilicone rubber, and modified silicone rubber (for example, acrylic modified, alkyd modified, ester modified, and epoxy modified ones). These may be used alone or in combination of two or more.

Examples of the rubber composition may include a composition containing a filler and rubber. Among these, a silicone rubber composition containing silicone rubber is preferable because it has high power generation performance.

Examples of the filler may include an organic filler, an inorganic filler, and an organic-inorganic composite filler. The organic filler is not limited in particular as long as it is an organic compound, and can be appropriately selected according to the intended purpose. Examples of the organic filler may include acrylic fine particles, polystyrene fine particles, melamine fine particles, fluororesin fine particles such as polytetrafluoroethylene, silicone powder (silicone resin powder, silicone rubber powder, and silicone composite powder), rubber powder, wood powder, pulp, and starch. The inorganic filler is not limited in particular as long as it is an inorganic compound, and can be appropriately selected according to the intended purpose.

Examples of the inorganic filler may include an oxide, a hydroxide, a carbonate, a sulfate, a silicate, a nitride, carbons, metal, and other compounds.

Examples of the oxide may include silica, diatomaceous earth, alumina, zinc oxide, titanium oxide, iron oxide, and magnesium oxide.

Examples of the hydroxide may include aluminum hydroxide, calcium hydroxide, and magnesium hydroxide.

Examples of the carbonate may include calcium carbonate, magnesium carbonate, barium carbonate and hydrotalcite.

Examples of the sulfate may include aluminum sulfate, calcium sulfate, and barium sulfate.

Examples of the silicate may include calcium silicate (wollastonite and xonotlite), zirconium silicate, kaolin, talc, mica, zeolite, perlite, bentonite, montmorillonite, sericite, activated clay, glass, and a hollow glass bead.

Examples of the nitride may include aluminum nitride, silicon nitride, and boron nitride.

Examples of carbons may include Ketjen black, acetylene black, graphite, carbon fibers, carbon nanofibers, carbon nanotubes, fullerenes (including derivatives), and graphene.

Examples of the metal may include gold, silver, platinum, copper, iron, aluminum, and nickel.

Examples of other compounds may include potassium titanate, barium titanate, strontium titanate, lead zirconate titanate, silicon carbide, and molybdenum sulfide. The inorganic filler may be surface-treated.

As the organic-inorganic composite filler, any compound that is a combination of an organic compound and an inorganic compound at the molecular level can be used without particular limitation.

Examples of the organic-inorganic composite filler may include silica-acrylic composite particles and silsesquioxane.

The average particle size of the filler is not limited in particular, and may be selected as appropriate according to the intended purpose. The average particular size is preferably 0.01 μm to 30 μm, and more preferably 0.1 μm to 10 μm. An average particle size of 0.01 μm or more can improve the generation performance. An average particle size of 30 μm or less can make the intermediate layer 4 deformable for enhanced generation performance.

The average particle size can be measured by a known method using a known particle size distribution measuring instrument such as Microtrac HRA (manufactured by Nikkiso Co., Ltd.).

The filler content relative to 100 parts by mass of rubber is preferably 0.1 to 100 parts by mass, and more preferably 1 to 50 parts by mass. A filler content of 0.1 parts or more by mass can improve the generation performance. A filler content of 100 parts or less by mass can make the intermediate layer 4 deformable for enhanced generation performance.

Other components are not limited in particular, and may be selected as appropriate according to the intended purpose. Examples may include additives. The content of the other components may be selected as appropriate without impairing the object of the present invention.

Examples of the additives may include a crosslinking agent, a reaction control agent, a filler, a reinforcing material, an antiaging agent, a conductivity control agent, a colorant, a plasticizer, a processing aid, a flame retardant, an ultraviolet absorber, a tackifier, and a thixotropic agent.

The methods for preparing the materials constituting the intermediate layer 4 are not limited in particular, and may be selected as appropriate according to the intended purpose. For example, the rubber composition may be prepared by mixing rubber, the filler, and, if needed, other components, and kneading and dispersing the mixture.

The method for forming the intermediate layer 4 is not limited in particular, and may be selected as appropriate according to the intended purpose. For example, a thin film of the rubber composition may be formed by applying the rubber composition onto a base by blade coating, die coating, dip coating, or the like, and then curing the rubber composition thermally or with an electron beam.

The average thickness of the intermediate layer 4 is not limited in particular, and may be selected as appropriate according to the intended purpose. In view of deformation followability, the average thickness is preferably 1 μm to 10 mm, and more preferably 20 μm to 1 mm. Average thicknesses within a preferable range enhance the film formability and will not interfere with deformation, so that satisfactory power generation can be performed. The silicone rubber layer that is the intermediate layer 4 according to the present embodiment has a film thickness of 20 μm.

The intermediate layer 4 preferably has an insulating property. As the insulating property, the intermediate layer 4 preferably has a volume resistivity of $10^8$ Ω·cm or more, and more preferably $10^{10}$ Ω·cm or more. The intermediate layer 4 may have a multilayer structure.

The insulator layer 5 (insulator layers 7 and 8) is desirably made of a resin having an aromatic ring in its straight chain or side chain and has an orientation. In the present embodiment, the insulator layer 5 (insulator layers 7 and 8) is made of silicone rubber. Releasing of charges can be suppressed by forming the insulator layer 5 (insulator layers 7 and 8) of a resin having an aromatic structure less prone to charge accumulation.

Next, a detailed structure of the element 1 will be described.

Embodiment 1

As shown in FIG. 1, an element 1 includes first and second electrodes 2 and 3 as a pair of electrodes, a deformable intermediate layer 4, and an insulator layer 5. The intermediate layer 4 is located between the first and second electrodes 2 and 3. The insulator layer 5 is in close contact with the intermediate layer 4.

The intermediate layer 4 is a rubber or rubber composition layer formed by performing a corona discharge-based surface modification treatment on a silicone rubber member.

The silicone rubber member used for the intermediate layer 4 is made of silicone rubber (KE-106 manufactured by Shin-Etsu Chemical Co., Ltd., two-component, transparent rubber) and approximately 20 μm in thickness. In other words, the intermediate layer 4 includes a silicon compound as a material.

The silicone rubber member is formed by blade coating of material silicone rubber and 30 minutes of high temperature sintering at 120° C., followed by a corona discharge treatment with an applied voltage of 100 V and cumulative energy of 500 J/cm². The resultant is machined into a rectangular shape of 20 mm×50 mm. Without the surface treatments, no signal derived from unpaired electrons is observed. Silicone rubber members including E' centers or iron oxide show a signal derived from the E' centers or iron oxide. Peroxide bonds are also detected by low temperature measurement.

unpaired electrons are made to be easily generated in the intermediate layer 4 by the corona discharge-based surface modification treatment being performed on the intermediate layer 4 in the state where the intermediate layer 4 is in close contact with the insulator layer 5. This enables high power generation.

The intermedia layer 4 here is a rubber or rubber composition layer containing a silicon compound as a material. However, such a configuration is not restrictive. The intermediate layer 4 may be any layer that contains a silicon compound as a material and has deformability. The deformability may include flexibility and rubber elasticity. More specifically, the deformability refers to such a degree of deformability that the layer can be deformed by external force applied by a user.

The first electrode 2 is patterned to be placed on the silicone rubber member.

In the present embodiment, an aluminum-deposited 12-μm PET film is used as the second electrode 3. The second electrode 3 is a continuous belt-like electrode located in contact with the intermediate layer 4.

Now, processing methods according to other embodiments 2 to 7 of the element 1 and comparative examples 1 to 7 to be compared with the element 1 will be described below. A description of portions overlapping with those of embodiment 1 will be omitted as appropriate.

Embodiment 2

Using a UV irradiation lamp (VL-215.C manufactured by Vilber Lourmat) instead of the corona discharge treatment in embodiment 1, an element was fabricated as in embodiment 1 by performing irradiation treatment under the following condition: a wavelength of 254 nm, a cumulative light amount of 300 J/cm², and nitric atmosphere with an oxygen partial pressure of 5000 ppm or less.

Embodiment 3

Using an electron beam irradiation source (line-emission low energy electron beam source manufactured by Hamamatsu Photonics K.K.) instead of the corona discharge treatment in embodiment 1, an element was fabricated as in embodiment 1 by performing irradiation treatment under the following condition: an irradiation amount of 1 MGy and nitric atmosphere with an oxygen partial pressure of 5000 ppm or less.

Embodiment 4

Rubber (DY35-2083 manufactured by Dow Corning Toray Co., Ltd.) was used as the silicone rubber member of the intermediate layer 4. The rubber included iron oxide as a material, and thus included iron oxide-derived unpaired electrons in its structure aside from unpaired electrons derived from a silicon compound generated by surface treatment.

The silicone rubber (DY35-2083) of the intermediate layer 4 showed an E' center-derived signal, as well as a wide ESR spectrum with a g value of 2.5 due to the inclusion of iron oxide.

Embodiment 5

Embodiment 5 included electrodes fixed by a different method. Embodiment 5 was an example where the pair of electrodes 2 and 3 were partly fixed to a film each. Such electrodes 2 and 3, when bent, slip over the insulator film 5 and intermediate layer 4.

Embodiment 6

Embodiment 6 was an example where silicone rubber was used as the insulator layer 5. More specifically, KE-1950-70 was used as the silicone rubber that was the insulator layer 5. The silicone rubber was diluted by 30% by weight of toluene and applied to an Al-deposited PET surface. The thickness was 20 μm.

Embodiment 7

Embodiment 7 was an example where silicone rubber was used as the insulator layer 5. More specifically, KE-1950-60 was used as the silicone rubber that was the insulator layer 5. The silicone rubber was diluted by 30% by weight of toluene and applied to an Al-deposited PET surface. The thickness was 20 μm.

Comparative Example 1

Unlike embodiment 1, comparative example 1 included an Al layer in contact with the silicone rubber of the intermediate layer 4.

Comparative Example 2

Unlike embodiment 2, comparative example 2 included an Al layer in contact with the silicone rubber of the intermediate layer 4.

Comparative Example 3

Unlike embodiment 3, comparative example 3 included an Al layer in contact with the silicone rubber of the intermediate layer 4.

Comparative Example 4

Unlike embodiment 4, comparative example 4 included an Al layer in contact with the silicone rubber of the intermediate layer 4.

Comparative Example 5

Unlike embodiment 5, comparative example 5 included an Al layer in contact with the silicone rubber of the intermediate layer 4.

Comparative Example 6

Unlike embodiment 3, comparative example 6 included the insulator layer 5 made of polyethylene. Polyethylene does not have any aromatic hydrocarbon in its straight chain.

Comparative Example 7

Unlike embodiments 6 and 7, comparative example 7 included the insulator layer 5 made of KE-1950-50 as silicone rubber.

Table 1 shows results obtained by making evaluations to be described below on each of the elements 1 fabricated as described above. In terms of "Evaluation 1: Initial Failure Rate", the results listed in Table 1 show only one failure in embodiment 1 among embodiments 1 to 7. There are a plurality of failures in all the test pieces of comparative examples 2 to 7.

In terms of "Evaluation 2: Durability Performance", all of embodiments 1 to 7 cleared 10000 rounds of test. None of the test pieces of comparative examples 2 to 7 cleared 10000 rounds of test.

In terms of "Evaluation 4: Rubber Elasticity Performance", a modulus of elasticity was 5.4 or higher, no initial failure occurred, and durability performance was high. Breakage can be prevented by causing the insulator layer to have a modulus of elasticity as high as or higher than six times a modulus of elasticity of the intermediate layer.

TABLE 1

| | Configuration | | | | | | Durability | | |
| --- | --- | --- | --- | --- | --- | --- | --- | --- | --- |
| | | | | Configu- | | | Initial | performance | |
| | Intermediate layer | Thickness (μm) | Surface modification | ration of generation element | Lower electrode + rubber material | Mudulus of elasticity | failure rate (%) | Number of times | Evaluation | Comprehensive evaluation |
| Embodiment 1 | KE-106 | 20 | Corona discharge treatment | Without spacer | Aluminum-deposited PET (12 μm) Rubber on PET surface | | 2 | 10000 or more | B | B |
| Embodiment 2 | KE-106 | 20 | UV irradiation | Without spacer | Aluminum-deposited PET (12 μm) Rubber on PET surface | | 0 | 10000 or more | B | B |
| Embodiment 3 | KE-106 | 20 | Electron beam irradiation | Without spacer | Aluminum-deposited PET (12 μm) Rubber on PET surface | | 0 | 10000 or more | B | B |
| Embodiment 4 | DY35-2083 | 20 | Electron beam irradiation | Without spacer | Aluminum-deposited PET (12 μm) Rubber on PET surface | | 0 | 10000 or more | B | B |
| Embodiment 5 | KE-106 | 20 | Electron beam irradiation | With spacer | Aluminum-deposited PET (12 μm) Rubber on PET surface | | 0 | 10000 or more | B | B |
| Embodiment 6 | KE-1950-20 | 20 | Corona discharge treatment | Without spacer | KE-1950-70 | 7.4 | 0 | 10000 or more | B | B |

TABLE 1-continued

|  | Configuration | | | | | | Durability | | | |
|---|---|---|---|---|---|---|---|---|---|---|
|  |  |  |  | Configu- |  |  | Initial | performance | | |
|  | Intermediate layer | Thickness (μm) | Surface modification | ratin of generation element | Lower electrode + rubber material | Mudulus of elasticity | failure rate (%) | Number of times | Evaluation | Comprehensive evaluation |
| Embodiment 7 | KE-1950-20 | 20 | Corona discharge treatment | Without spacer | KE-1950-60 | 5.4 | 0 | 10000 or more | B | B |
| Comparative example 1 | KE-106 | 20 | Corona discharge treatment | Without spacer | Aluminum-deposited PET (12 μm) Rubber on aluminum surface |  | 10 | 187 | C | C |
| Comparative example 2 | KE-106 | 20 | UV irradiation | Without spacer | Aluminum-deposited PET (12 μm) Rubber on aluminum surface |  | 6 | 721 | C | C |
| Comparative example 3 | KE-106 | 20 | Electron beam irradiation | Without spacer | Aluminum-deposited PET (12 μm) Rubber on aluminum surface |  | 8 | 324 | C | C |
| Comparative example 4 | DY35-2083 | 20 | Electron beam irradiation | Without spacer | Aluminum-deposited PET (12 μm) Rubber on aluminum surface |  | 8 | 482 | C | C |
| Comparative example 5 | KE-106 | 20 | Electron beam irradiation | With spacer | Aluminum-deposited PET (12 μm) Rubber on aluminum surface |  | 16 | 252 | C | C |
| Comparative example 6 | KE-106 | 20 | Electron beam irradiation | Without spacer | Aluminum-deposited polyethylene (20 μm) Rubber on resin surface |  | 0 | 326 | C | C |
| Comparative example 7 | KE-1950-20 | 20 | Corona discharge treatment | Without spacer | KE-1950-50 | 2.5 | 4 | 6243 | C | C |

To make the evaluations shown in Table 1, elements 1 having the configuration shown in FIG. 1 were fabricated by applying 20 μm of silicone rubber layer to the PET surface of a 210×297-mm (A4) aluminum-deposited PET film, sintering the resulting film for surface modification, and placing a 210×297-mm (A4) aluminum-deposited PET film thereon with the Al side on the silicone rubber.

(Evaluation 1): Initial Failure Rate

Concerning the intermediate layer 4 (such as silicone rubber), the initial failure rate indicates the rate of failures in the surface treatment and in the electrode material. Concerning the insulator layer 5 (silicone rubber), the initial failure rate indicates the rate of failures under the surface treatment condition. The initial failure rate indicates the initial rate of occurrence of short-circuits between the upper and lower electrodes. The total number of samples was 50.

(Evaluation 2): Bending Durability Performance

Figure 5:
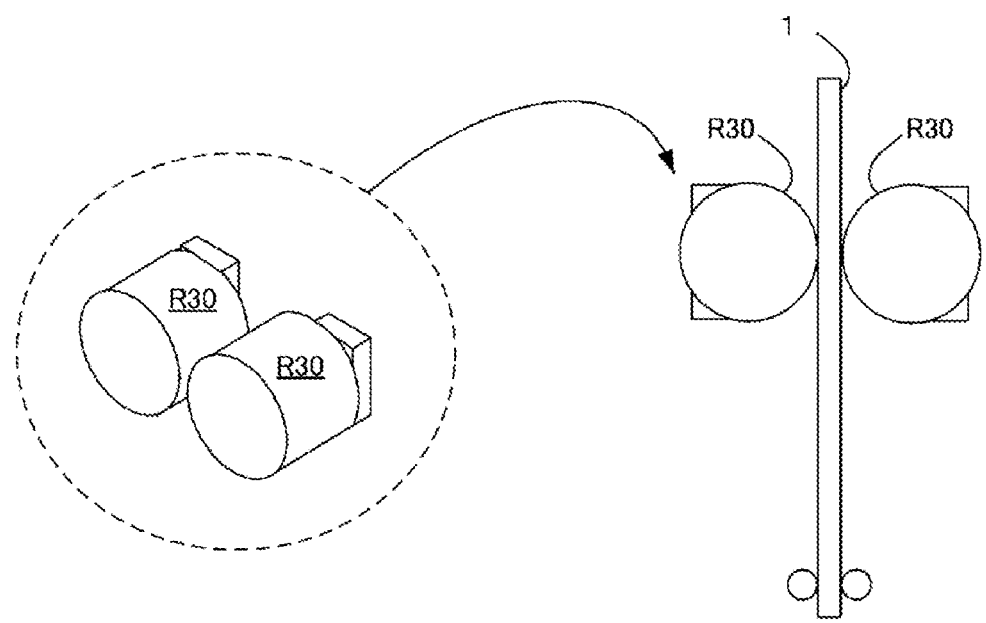
FIG. 5 is a diagram showing an example of a pre-bending state in an operation of a bending tester used for durability evaluation.

FIG. 5 is a diagram showing an example of a pre-bending state in an operation of a bending tester used for durability evaluation. As shown in FIG. 5, to measure the bending durability performance of the elements 1 formed in a cell shape, a 90° bending test was performed by using a tabletop durability tester TCDM111LH (manufactured by Yuasa System Co., Ltd.).

Ten samples of an element 1 were stacked between R30 jigs and connected in series. The samples were subjected to 10000 rounds of durability test 10 reciprocations per minute, and a p-p voltage value was measured. The samples were fabricated as vertically long films.

The number of times at which the p-p voltage value dropped by 10% from the initial value was recorded in the number of times field.

(Evaluation 3): Electron Spin Resonance (ESR) Measurement

Figure 6:
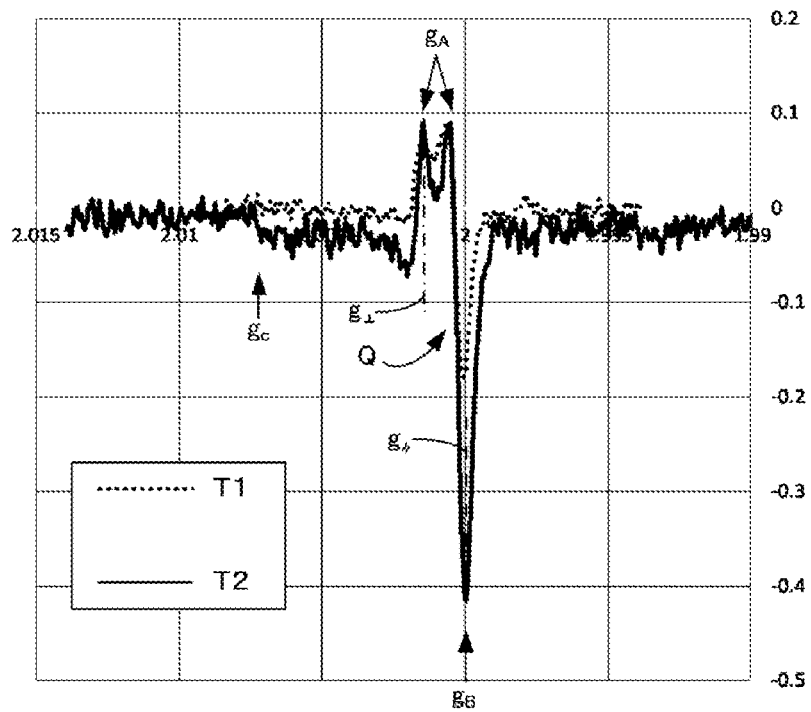
FIG. 6 is a chart showing examples of ESR measurements of an intermediate layer.

FIG. 6 is a diagram showing examples of ESR measurements of an intermediate layer 4. The material evaluation tests on the intermediate layer 4 were performed by using a silicone rubber layer electron spin resonance spectrometer ESR (JEX-X310) (manufactured by JOEL Ltd.). In FIG. 6, the broken line indicates a measurement T1 in the case where the ambient temperature was room temperature, and the solid line indicates a measurement T2 in the case where the ambient temperature was −150° C.

Electron spin resonance is generally displayed with a g value that is a function of the magnetic field strength on the horizontal axis, and the first derivative waveform of the absorption spectrum on the vertical axis. The g value is a value inherent to each ESR signal, determined by the frequency (ν) of the microwaves applied to the sample and the strength (H) of the resonance magnetic field. ESR signals and lattice defects are identified by using the g value.

An ESR signal is used to observe a resonance phenomenon due to absorption of microwaves (electromagnetic waves having a frequency of around 9.4 GHz and a wavelength of around 3 cm: X band) resulting from spin transition of unpaired electrons. Detection of an ESR signal means that there is an unpaired electron in the sample. In other words, detection of a peak in the measurement waveform with the g value on the horizontal axis means detection of an unpaired electron.

FIG. 6 shows the ESR signals of the intermediate layer 4 described in embodiment 3.

How to read FIG. 6 will be described in more detail. Isotropic materials are known to show ESR signal strength substantially symmetric about a reversal point. By contrast, both the waveforms T1 and T2 shown in FIG. 6 are asymmetrical about a reversal point Q. This shows that the intermediate layer 4 has an anisotropic structure.

Both peak values $g_A$ and $g_B$ of the ESR signals displayed as the measurements T1 and T2 well coincide with the measurements of the E' center g⊥ (=2.0014) and the E' center g∥ (=2.0004) obtained from deficiencies in quartz glass.

The coincidence is considered to indicate that the surface treatment causes deficiencies of oxygen O in the silicone rubber, and there are unpaired electrons at the deficiency positions.

Detection of two peaks of the E' center g∥ in a typical quartz glass structure indicates the presence of anisotropy in the depth direction of the sample, i.e., the thickness direction of the intermediate layer 4.

That the measurement T1 of the intermediate layer 4 according to the present embodiment has two peaks between g values of 2.004 and 1.998 is thus considered to indicate the presence of anisotropy in the thickness direction of the intermediate layer 4.

The measurement T2 shows a peak value $g_c$ of the ESR signal between g values of 2.070 and 2.001.

In general, low temperature measurement at −150° C. reduces the effect of electrons' thermal motion and relaxation time. This improves the sensitivity of the ESR signal, and enables measurement of ESR signals difficult to observe in a room temperature environment.

The peak value $g_c$ in the measurement T2, which is not detected in the measurement T1, is considered to represent a peroxide radical.

In other words, the intermediate layer 4 according to the present embodiment "has at least one peak between g values of 2.04 and 1.98 when measured by using an electron spin resonance spectrometer". Such a signal is exhibited by unpaired electrons particularly likely to retain charges, and a large amount of power generation can be maintained.

Like the intermediate layer 4, the insulator layer 5 also "has at least one peak between g values of 2.04 and 1.98 when measured by using an electron spin resonance spectrometer". Such a signal is exhibited by unpaired electrons particularly likely to retain charges, and a large amount of power generation can be maintained.

As is evident from the measurement T2, the intermediate layer 4 according to the present embodiment "has at least one peak between g values of 2.070 to 2.001 when measured at −150° C. by using an electron spin resonance spectrometer". Such a signal is exhibited by unpaired electrons particularly likely to retain charges, and a large amount of power generation can be maintained.

On the basis of the foregoing measurements, samples exhibiting a negative peak as much as or more than 80% that in the spectrum of the measurement T2 according to embodiment 3 are marked with A, 30% or so with B, and no peak with C in Table 1.

The samples of embodiment 3 were subjected to the same measurement again at least six months after the surface modification treatment, and found to exhibit a similar spectrum. That is, the unpaired electron structure according to the present invention was stably maintained in the intermediate layer 4.

Table 2 shows measurements of ESR signals when corona discharge, UV irradiation, and electron beam irradiation surface treatments were applied to silicone rubber and PET.

TABLE 2

| Corresponding embodiment | Measurement sample | Thickness (μm) | Surface modification | ESR signal (−150° C.) |
| --- | --- | --- | --- | --- |
| Embodiment 1 | KE-106 | 20 | Corona discharge treatment | Trace |
| Embodiment 2 | KE-106 | 20 | UV irradiation | Trace |
| Embodiment 3 | KE-106 | 20 | Electron beam irradiation | High |
| Embodiment 4 | DY35-2083 | 20 | Electron beam irradiation | High |
| Embodiment 1 | PET portion of lower electrode | 10 | Corona discharge treatment | None |
| Embodiment 2 | PET portion of lower electrode | 10 | UV irradiation | None |
| Embodiment 3 | PET portion of lower electrode | 10 | Electron beam irradiation | Low |

The measurement samples listed were formed by forming an intermediate layer 4 on a second electrode 3 each, and then performing the respective surface treatments. The measurement samples were obtained by releasing the respective intermediate layers 4. The PET portions of the second electrodes 3 remaining after the release of the intermediate layers 4 from which aluminum was dissolved off with dilute hydrochloric acid were used as measurement samples.

ESR signals were classified as follows:
None: not distinguishable from background noise;
Trace: there evidently was a signal but difficult to quantify, compared to the background noise;
Low: there evidently was a quantifiable signal; and
High: there was a signal one or more digits higher than the low signal.

(Evaluation 4): Rubber Elasticity Performance

The rubber elasticity performance of the elements 1 was measured by using the instrument described below. Rubber elasticity refers to entropic elasticity that a polymer including crosslinked points exhibits.

Method 1 for evaluating the modulus of elasticity will initially be described.

Method 1 for Evaluating Modulus of Elasticity

A rubber elasticity evaluation test was performed by using a compression tester (STROGRAPH VE5D (manufactured by Toyo Seiki Seisaku-sho, Ltd.)) under the following condition:
Load range: 50 N;
Load range: ×100;
Test speed: 500 mm/min;
Chuck distance: 60 mm;
Measurement temperature: room temperature @B3-110
Samples: punched by a dumbbell shape No. 6 cutter, 4 mm in width; and
Gauge length: 20 mm Next, method 2 for evaluating the modulus of elasticity will be described.

Method 2 for Evaluating Modulus of Elasticity

A rubber elasticity evaluation test was performed by taking into account the Poisson's ratio of the indenter and that of the material based on the Martens hardness (ISO 14577). In particular, intermediate layers 4 having a thickness of 100 μm or less were measured by the technique according to method 2 for evaluating the modulus of elasticity.

As described above, according to the present embodiment, at least one insulator layer 5 is located between the pair of electrodes 2 and 3 of the element 1. Even if an intermediate layer 4 having low tear strength is thinly formed for purposes such as improved power generation performance, the provision of the insulator layer 5 in contact with the intermediate layer 4 can reduce the initial failure rate during manufacturing and improve durability.

Since fabrication as a thinner dielectric is possible, a small-sized high-output power generation device can be provided by staking a large number of dielectrics.

An embodiment provides an effect that if an intermediate layer having low tear strength is thinly formed, the initial failure rate during manufacturing can be reduced and durability can be improved.

While the preferred embodiment of the present invention has been described, the present invention is not limited to such a specific embodiment. Various modifications and changes may be made without departing from the gist of the present invention set forth in the claims, unless otherwise specified in the foregoing description.

For example, the element described in the foregoing embodiment is not limited to a power generation element but may be used as a sensor that is a detection element for detecting contact in the form of an electrical signal. The element may also be used as other elements that convert external force into electrical energy.

The effects described in the embodiment of the present invention are merely examples of some of the most suitable effects of the present invention. The effects of the present invention are therefore not limited to those described in the embodiment of the present invention.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

What is claimed is:

1. An element comprising:
   a pair of electrodes;
   an intermediate layer between the pair of electrodes, the intermediate layer containing a silicon compound including unpaired electrons as a material, the intermediate layer being deformable; and
   at least one insulator layer between the pair of electrodes, wherein the insulator layer has at least one peak between g values of 2.04 and 1.98 when measured using an electron spin resonance (ESR) spectrometer.

2. The element according to claim 1, wherein the insulator layer has a modulus of elasticity as high as or higher than six times a modulus of elasticity of the intermediate layer.

3. The element according to claim 1, wherein the insulator layer comprises a resin including an aromatic ring in a straight chain or a side chain.

4. The element according to claim 1, wherein the intermediate layer contains particles having unpaired electrons.

5. The element according to claim 1, wherein the intermediate layer has at least one peak between g values of 2.04 and 1.98 when measured using an electron spin resonance (ESR) spectrometer.

6. The element according to claim 1, wherein the intermediate layer has at least one peak between g values of 2.070 to 2.001 when measured under an ambient temperature of −150° C. using an electron spin resonance (ESR) spectrometer.

7. The element according to claim 1, wherein the insulator layer comprises silicone rubber.

8. A method for manufacturing an element, comprising:
   disposing at least one insulator layer between a pair of electrodes between which an intermediate layer containing a silicon compound including unpaired electrons as a material and being deformable is disposed, wherein the insulator layer has at least one peak between g values of 2.04 and 1.98 when measured using an electron spin resonance (ESR) spectrometer.

9. The method for manufacturing an element according to claim 8, wherein a surface modification treatment is performed on the intermediate layer in a state where the intermediate layer is in close contact with the insulator layer.

10. The method for manufacturing an element according to claim 9, wherein the intermediate layer is subjected to the surface modification treatment selected from a corona discharge treatment, a UV irradiation treatment, and an electron beam irradiation treatment.

11. The method for manufacturing an element according to claim 8, wherein the insulator layer comprises silicone rubber.

* * * * *